United States Patent
Schempp, III et al.

(10) Patent No.: US 7,540,418 B2
(45) Date of Patent: Jun. 2, 2009

(54) POINT OF SALE TRANSACTION SYSTEM

(75) Inventors: Frederick A. Schempp, III, Webster, NY (US); Kevin M. Pickhardt, Pittsford, NY (US); Paul J. van Wichen, Rochester, NY (US); Nicholas D. Bartolotti, Honeoye Falls, NY (US)

(73) Assignee: Pharos Systems International, Inc., East Rochester, NY (US)

( * ) Notice: Subject to any disclaimer, the term of this patent is extended or adjusted under 35 U.S.C. 154(b) by 66 days.

(21) Appl. No.: 11/702,459

(22) Filed: Feb. 5, 2007

(65) Prior Publication Data

US 2007/0246533 A1 Oct. 25, 2007

Related U.S. Application Data

(63) Continuation of application No. 60/771,944, filed on Feb. 9, 2006.

(51) Int. Cl.
*G06K 15/00* (2006.01)
(52) U.S. Cl. ........................ 235/383; 235/375; 235/487; 705/26

(58) Field of Classification Search ................ 235/383, 235/379, 380, 381, 487; 705/26, 35, 39, 705/75
See application file for complete search history.

(56) References Cited

U.S. PATENT DOCUMENTS

| | | | |
|---|---|---|---|
| 6,490,567 B1* | 12/2002 | Gregory | 705/39 |
| 2002/0059148 A1* | 5/2002 | Rosenhaft et al. | 705/77 |
| 2004/0243476 A1* | 12/2004 | Borenstein et al. | 705/26 |
| 2006/0106699 A1* | 5/2006 | Hitalenko et al. | 705/35 |
| 2007/0220614 A1* | 9/2007 | Ellis et al. | 726/27 |

* cited by examiner

*Primary Examiner*—Edwyn Labaze
(74) *Attorney, Agent, or Firm*—Neal L. Slifkin

(57) ABSTRACT

A point of sale document transaction system ("POSDTS") provides a wholly contained system for authenticating users and payment methods for the authorization and charging of document output via industry standard methods of Electronic Funds Transfer. The POSDTS provides self service payment and collection at an output device without need for additional back end or server systems and integrates directly into industry standard financial interfaces. POSDTS operation can be extended to include any series of production devices that can be controlled via electronic means, network protocols, or embedded software.

10 Claims, 7 Drawing Sheets

POINT OF SALE TRANSACTION SYSTEM

RELATIONSHIP TO OTHER APPLICATIONS AND PATENTS

The present application draws priority from a pending U.S. Provisional patent application, Ser. No. 60/771,944, filed Feb. 9, 2006.

FIELD OF THE INVENTION

The present invention relates to methods and apparatus for electronic entry and storage of data; more particularly, to document input and output devices for electronic entry of data; and most particularly, to a system for point of sale (POS) transactions wherein a terminal or software acting as a terminal (synonymous herein with a "controlled device") is used to audit and control a document input and output device and is directly linkable to one or more electronic destinations outside the system without passing through a central accounting unit.

BACKGROUND OF THE INVENTION

Electronically-controlled POS terminals are well known, for example, cash registers, dispensing machines, and Automated Teller Machines (ATMs). A typical prior art terminal accepts a magnetically-striped access card or other means of authentication of user and account information such as a credit card, or other entry, such as a keyed code and data entry. A prior art terminal is a peripheral to a central electronic accounting system and designed to facilitate a financial transaction with outside systems such as banks, credit card companies, or other businesses.

What is needed in the art is method and apparatus whereby a stand-alone POS terminal may audit and control a document output device and communicate directly with one or more outside systems as may be desired without going through a central accounting or processing system.

It is a primary object of the present invention to provide a wholly-contained POS system that includes a least one document input and output device.

SUMMARY OF THE INVENTION

A wholly-contained point of sale document transaction system in accordance with the invention comprises a controlled device (for example, a printer, fax, or other type of vending machine); an authentication device (for example, a credit or debit card stripe reader); and a transaction control system. The transaction control system, comprising transactional protocols in a real or virtual terminal, accomplishes the functions of configuring what services are to be provided; authenticating a walk-up user and method of payment; authorizing permission for use; allowing use of the control device to provide fulfillment to the user; and transaction processing to a designated financial institution.

BRIEF DESCRIPTION OF THE DRAWINGS

The present invention will now be described, by way of example, with reference to the accompanying drawings, in which.

DETAILED DESCRIPTION OF THE EMBODIMENTS

A point of sale document transaction system (POSDTS) in accordance with the invention provides a wholly contained system for authenticating users and payment methods for the authorization and charging of vended output via industry standard methods of Electronic Funds Transfer (EFT). The POSDTS provides self service payment and collection at an output device without need for additional back end or server systems and is directly integrated into industry standard financial interfaces. The POSDTS operation can be extended to include any series of production devices that can be controlled via electronic means, network protocols, or embedded software.

A POSDTS in accordance with the invention must include a user interface for authenticating a user. In the prior art, few controlled devices are so equipped.

Figure 1:
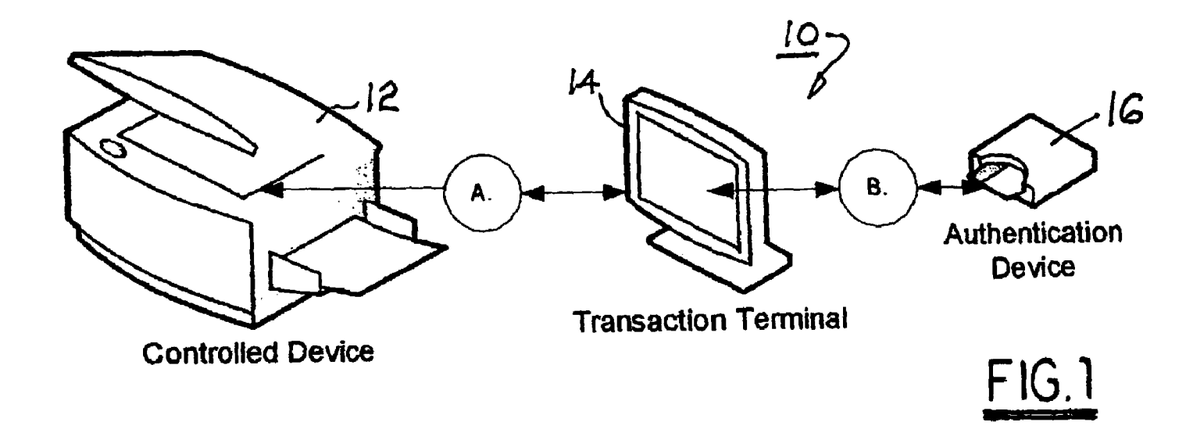
FIG. 1 is a schematic drawing of an authentication subsystem for a POS controlled device without a suitable integrated user interface and requiring a user authentication device, such as a credit card reader.

Referring to FIG. 1, an authentication subsystem 10 includes an exemplary "dumb" controlled device 12 (indicated schematically and for purposes of illustration as a document copier and/or printer) without an integrated user interface. Controlled device 12 is connected via a supplementary user interface A to a transaction terminal 14 and authentication device 16 suitable for use in accordance with the invention.

Interface A may be specific to controlled device 12 or to a particular manufacturer. Interface A may be any combination of electrical and software protocols, and may be an industry standard interface such as, for example, serial, parallel, USB, or Ethernet, or it may be proprietary to the particular model of controlled device 12. Interface B may be any industry standard interface used to communicate between a computing device such as transaction terminal 14 and an authentication device. The controlled device 12 may be any device having an electronically controlled output. Transaction terminal 14 is a combination of hardware and software that provides computational capabilities; user input, such as touch screen buttons, signature capture, virtual keyboards, and the like; output interface via LCD or CRT display in either color or black and white; document workflow controls, such as print holding queues and scanning holding queues; communications to controlled device 12; communication with any financial institution via phone line, network, or proprietary interface; and communication with authentication device 16. Authentication device 16 may be any industry standard hardware device used to authenticate a user, for example, a magnetic stripe card reader, a barcode reader, a biometric or proximity reader, or the like.

A POSDTS in accordance with the invention further must include a transaction interface for conducting transactions.

Figure 2:
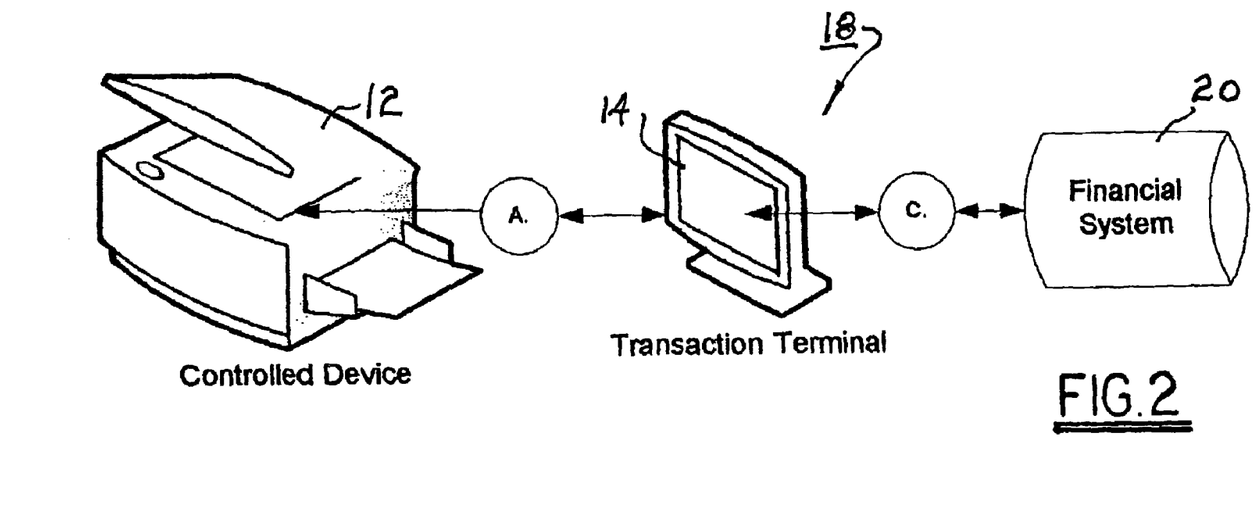
FIG. 2 is a schematic drawing of an authorization subsystem for a POS controlled device without a suitable computing environment that would accept authentication via access code or account number.

Referring to FIG. 2, an authorization subsystem 18 includes "dumb" controlled device 12 without a suitable computing environment. Controlled device 12 is connected via supplementary user interface A to transaction terminal 14 and via transaction interface C to a financial system 20.

Interface C may be any standard interface used to communicate between a computing device capable of conducting an Electronic Fund Transfer, POS transaction, or any other financial transaction, or a charge to a valid cell phone via authorization from the cell phone operator, and an existing financial system.

Financial system 20 may be an existing internal financial system, a bank, a retailer's processor, a debit network, or any other system capable of processing a financial transaction.

Figure 3:
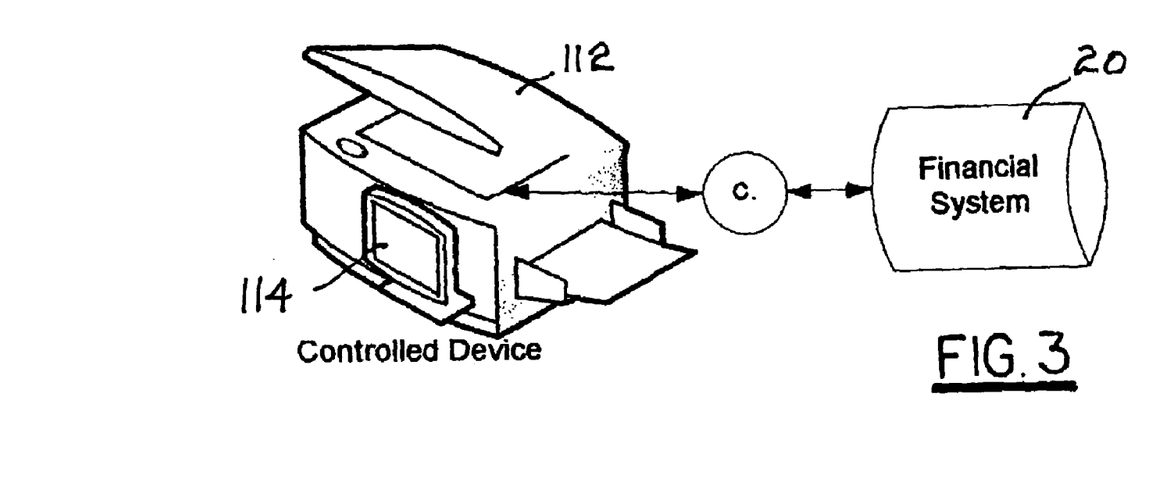
FIG. 3 is a schematic drawing of an authorization subsystem for a POS controlled device having a suitable computing environment that would accept authentication via access code or account number.

Referring to FIG. 3, a "smart" controlled device 112 includes the elements of controlled device 12 plus interface A plus transaction terminal 14 described above (which may be in the form of digital media operating on the controlled device 112), in an integrated transaction terminal 114. Thus, only interface C is required for controlled device 112 to communicate with financial system 20.

Figure 4:
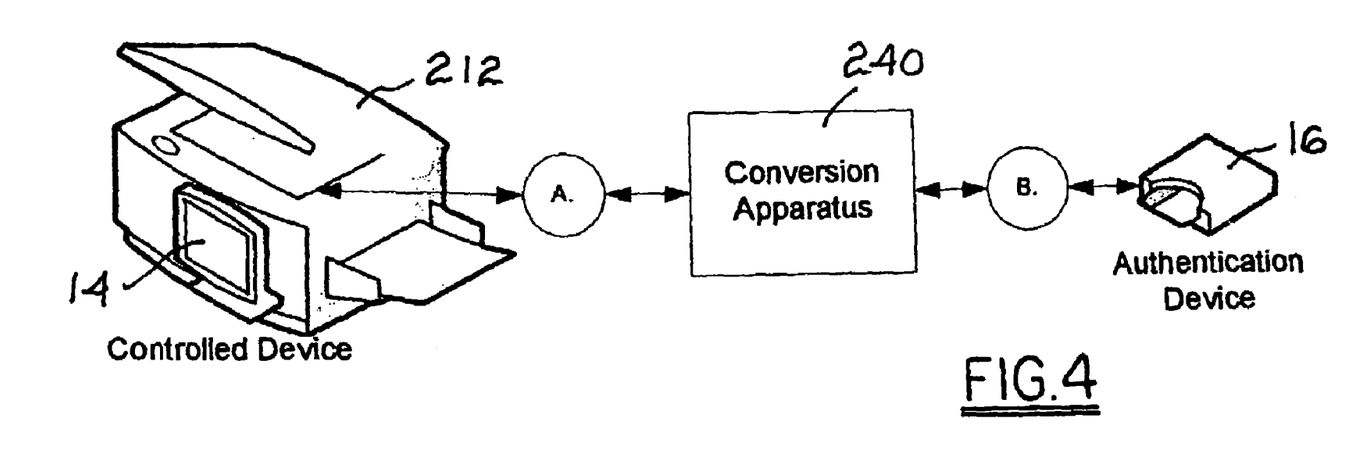
FIG. 4 is a schematic drawing of an authentication subsystem for a POS controlled device having a suitable integrated user interface and requiring a user authentication device, such as a credit card reader.

Referring to FIG. 4, a "smart" controlled device 212 includes the elements of controlled device 12 plus transaction terminal 14 described above. A conversion apparatus 240 provides the electrical and protocol conversion between interface A and interface B, allowing communication between controlled device 212 and authentication device 16. This conversion apparatus 240 may be a specialized apparatus providing conversion features or may be an embedded conversion apparatus within the controlled device 212.

Figure 5:
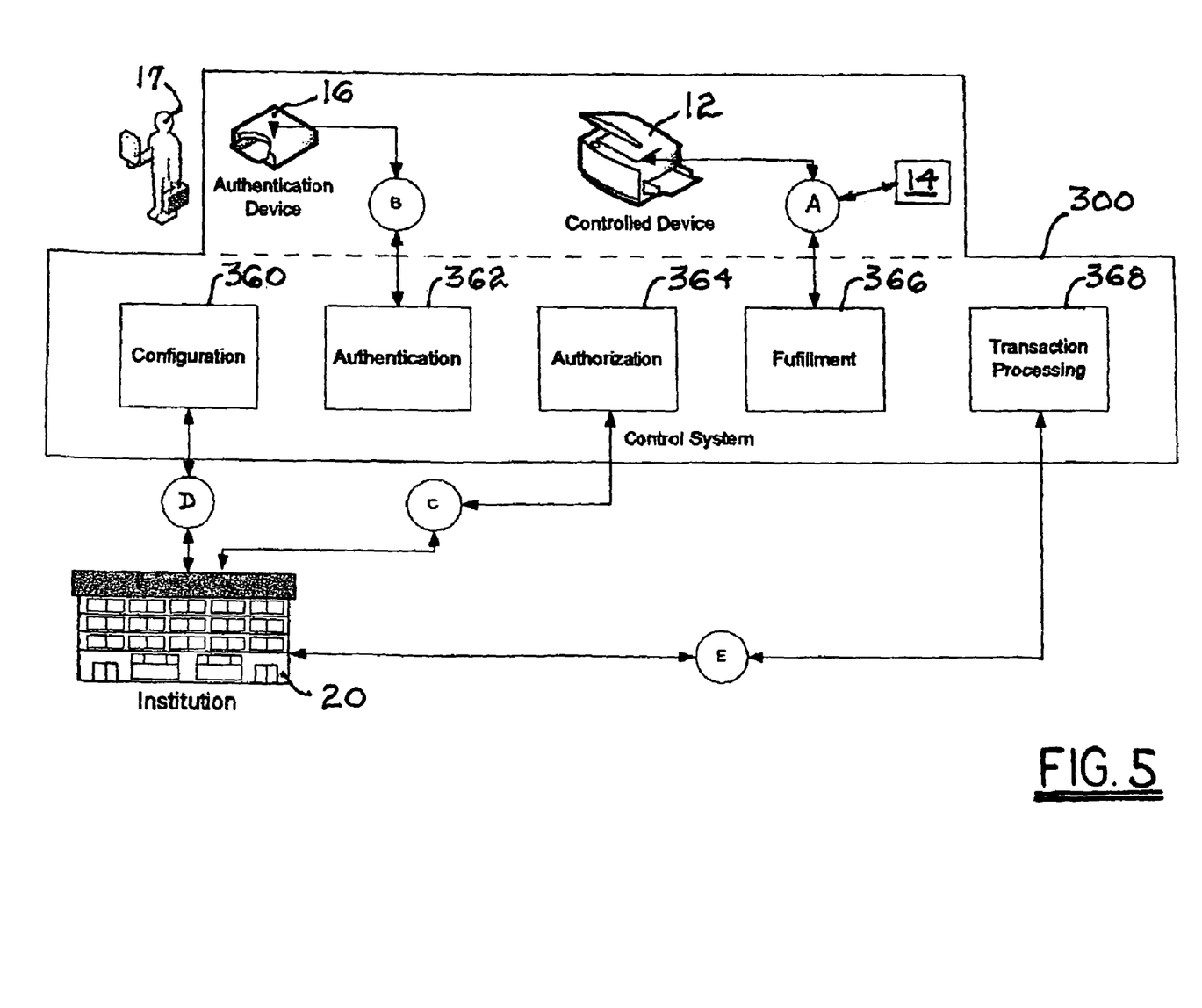
FIG. 5 is a schematic drawing showing a POS control system with subsystem functions in accordance with the invention having internal funds transfer capability.

Referring now to FIG. 5, a first process flow is shown for internal funds transfer to a merchant institution 20 by a POSDTS 300 in accordance with the invention.

POSDTS 300 includes controlled device 12 and interface A, and authentication device 16 and interface B; and communicates with a merchant institution 20 via interfaces C, D, and E. POSDTS 300 includes the internal functions of Configuration 360, Authentication 362, Authorization 364, Fulfullment 366, and Transaction Processing 368. Exemplary algorithms for these internal functions are shown in FIGS. 7 through 11, respectively.

In an exemplary transactional sequence:

a) merchant institution 20 communicates via interface D to Configuration 360 to configure which services are to be provided by controlled device 12, the associated costs, discount structures, SKU numbers, and the like;

b) an end user 17 desiring to use controlled device 12 (for example, to scan, copy, fax, or print a document) enters individual authentication means and method of payment into authentication device 16 via one or more of: swiping a credit or debit card; logging into a system that has stored such credit information, using a proximity credit system; or entering a valid code or identification that has been credited with funds or otherwise approved for credit use or stored value;

c) user 17 authenticates using options from step a) via a developed method of interaction that may include any or all of: software loaded onto controlled device 12; hardware integrated with controlled device 12; or use of a terminal POS device 14 that can control controlled device 12; or network communication with controlled device 12;

d) the authentication information is communicated to Authentication 362 in POSDTS 300 via interface B;

e) POSDTS 300 captures the user information and provides authorization permission based upon desired rules that can be used to optionally limit access to particular users, payment methods, services, operations, times of use, or any of a user-definable list of business access rules; Authorization 364 communicates authorization information to institution 20 via interface C;

f) POSDTS 300 turns on use of controlled device 12, enabling any features based upon their permission level, based on successful authorization from institution 20, and tracks use of controlled device 12, including, for example, printing, scanning (with delivery via email, USB, or other mechanism that may involve delivery through connection to controlled device 12 or transaction terminal 14), copying, vending, and any other related pricing information including, but not limited to, color usage, paper usage, page size, speed, and finishing options such as stapling or binding to determine relevant costing and pricing information; POSDTS 300 communicates to controlled device 12 via interface A;

g) after controlled device 12 has manufactured or otherwise delivered the requested service, the user's account is charged or debited for use of controlled device 12 via a direct communication via interface E between POSDTS 300 and a backend transaction processing system which may be any Enterprise Accounting system as may be housed in merchant institution 20 or other institution; POSDTS 300 interfaces directly with such back end processing systems without the air of a pre-processing server by emulating any other number of POS devices including, but not limited to, cash registers, POS terminals, or other transaction import/export functions; payment transaction may be authorized by cell phone and the financial transaction processed through the cell service provider; and h) the user's activity is logged for audit purposes in POSDTS 300, and the user receives an automatic receipt generated by POSDTS 300 and sent as a print job to controlled device 12 or alternatively to a receipt printer (not shown) via interface A.

Figure 6:
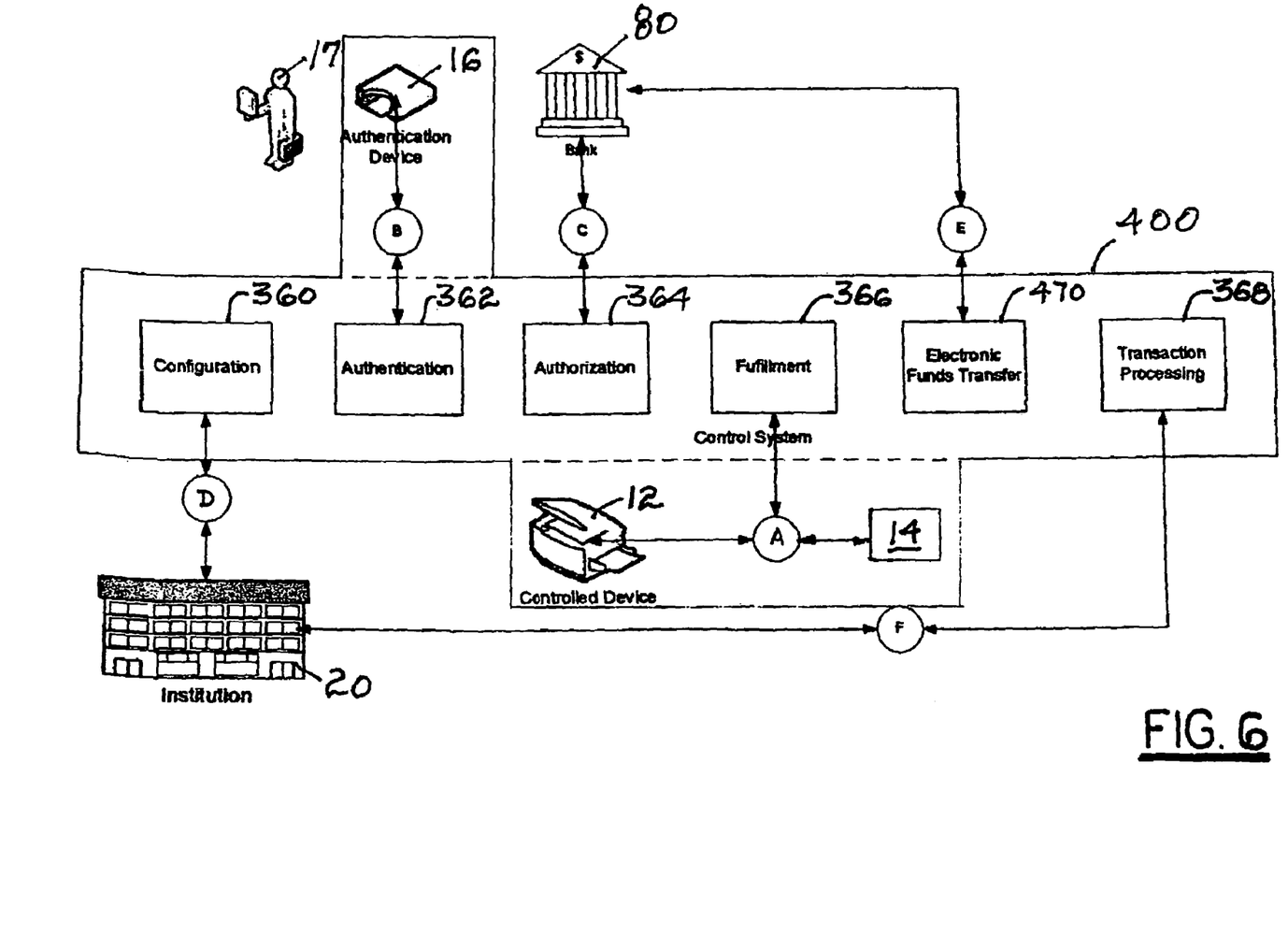
FIG. 6 is a schematic drawing showing a POS control system with subsystem functions in accordance with the invention having external funds transfer capability.
Figure 7:
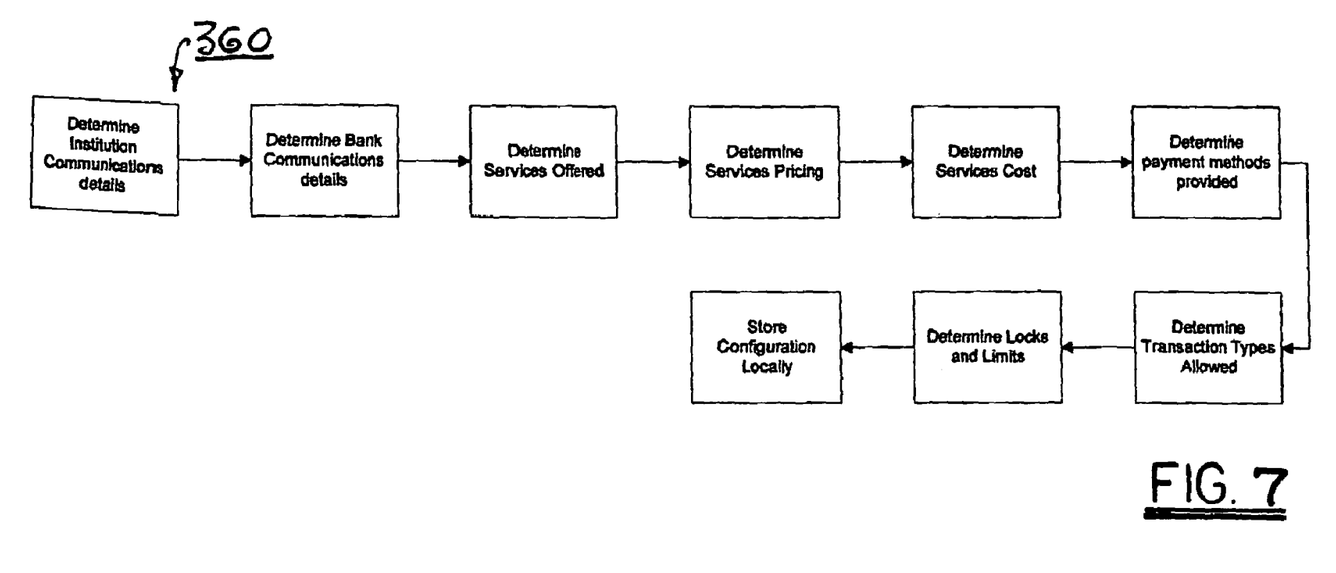
FIG. 7 is an exemplary algorithm for the Configuration function.
Figure 8:
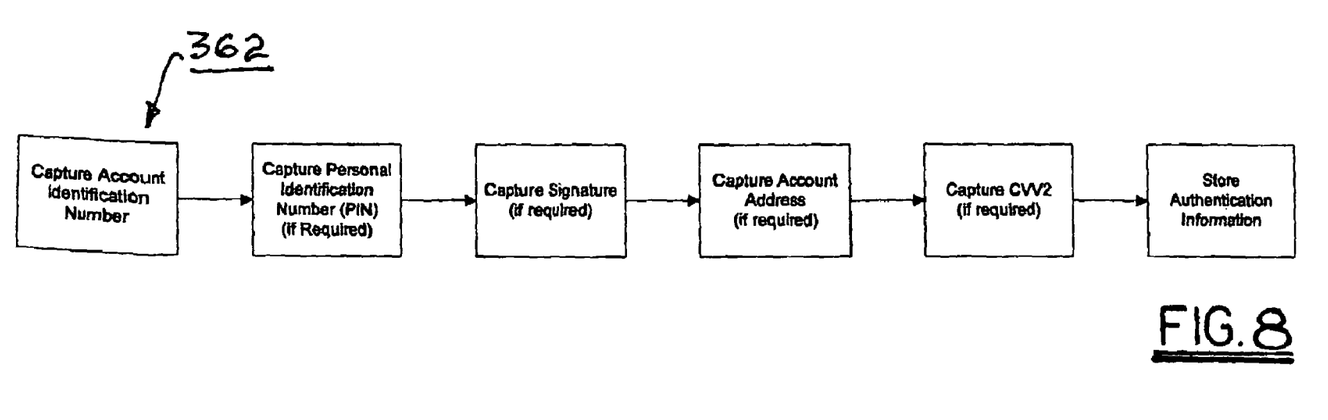
FIG. 8 is an exemplary algorithm for the Authentication function.
Figure 9:
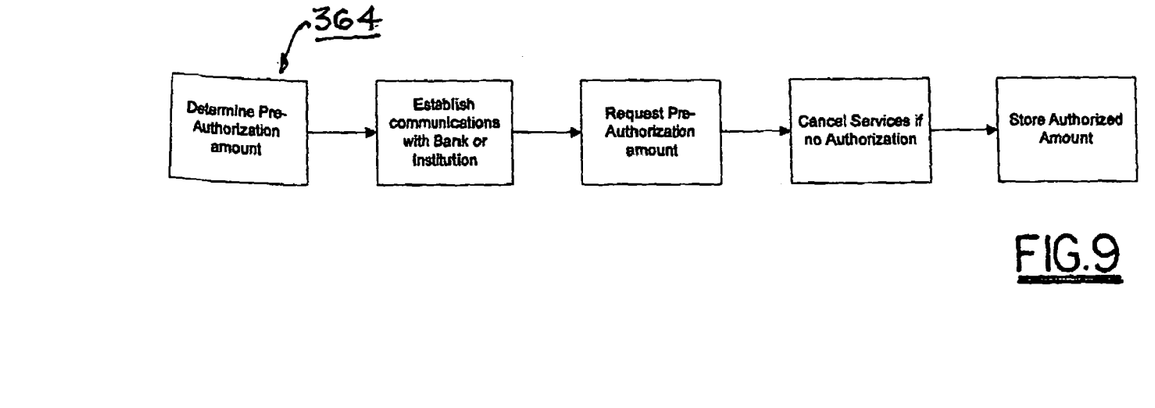
FIG. 9 is an exemplary algorithm for the Authorization function.
Figure 10:
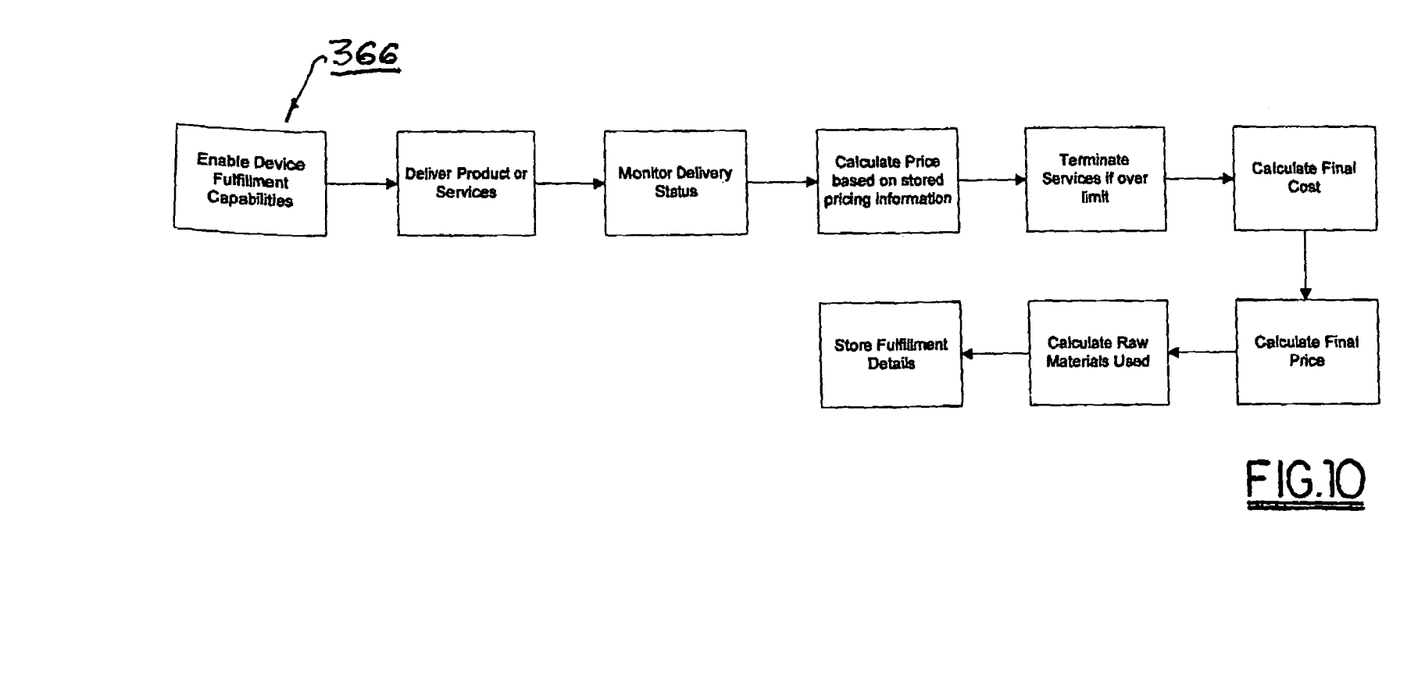
FIG. 10 is an exemplary algorithm for the Fulfillment function.
Figures 11, 12:
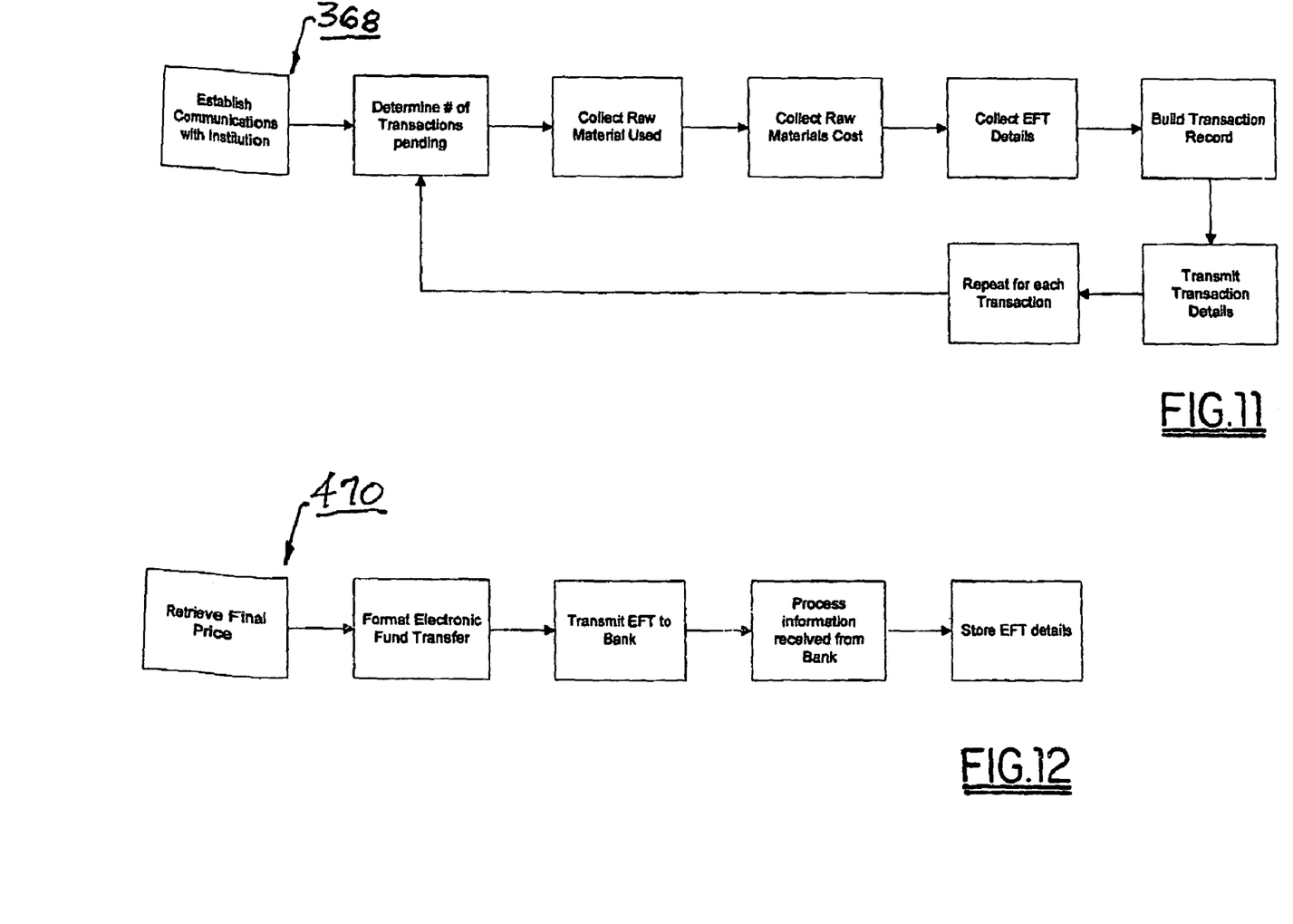
FIG. 11 is an exemplary algorithm for the Transaction Processing function.
FIG. 12 is an exemplary algorithm for the Electronic Funds Transfer function.

Referring now to FIG. 6, a second process flow is shown for external transfer of funds to a financial institution 80 other than merchant institution 20 by a POSDTS 400 in accordance with the invention. POSDTS 400 is structured like POSDTS 300 but with the addition of an Electronic Funds Transfer (EFT) function 470 that communicates with a bank or other external financial institution 80. An exemplary algorithm for the EFT function is shown in FIG. 12.

Steps a) through d) are identical with the operation of POSDTS 300 in the first process flow shown in FIG. 5. However, at step e) Authorization 364 communicates via interface C with bank 80 rather than merchant institution 20. Further, at step g) the user's account at bank 80 is charged or debited through a direct communication between Electronic Funds Transfer 470 and bank 80 via interface E.

While the invention has been described by reference to various specific embodiments, it should be understood that numerous changes may be made within the spirit and scope of the inventive concepts described. Accordingly, it is intended that the invention not be limited to the described embodiments, but will have full scope defined by the language of the following claims.

What is claimed is:

1. A wholly-contained point of sale transaction apparatus comprising:
   a) a controlled device for rendering a service to a user in exchange for payment thereof by a user;
   b) an authentication device for providing authenticating input data from said user of said controlled device;
   c) terminal means for entering user information and request for services to said controlled device; and
   d) computer means programmed to a plurality of algorithms for
   configuring which services are to be provided by said controlled device to any prospective user,
   authenticating said user,
   authorizing user permission of said controlled device to carry out said point of sale transaction,
   fulfilling said user request for services by turning on use of said controlled device, enabling any user requested services based upon a predetermined permission level, and tracking use of said controlled device, and
   processing said transaction by charging or debiting said user for use of said controlled device after said fulfilling step to manufacture or otherwise deliver said requested service.

2. A wholly-contained apparatus in accordance with claim 1 wherein said terminal means is selected from the group consisting of hardware, software, and combinations thereof.

3. A wholly-contained apparatus in accordance with claim 1 wherein said computer means is integral with said terminal means.

4. A wholly-contained apparatus in accordance with claim 1 wherein said controlled device is a printer and wherein input of print jobs is selected from the group consisting of an electronic network and directly through said controlled device or said terminal means.

5. A wholly-contained apparatus in accordance with claim 1 wherein said controlled device is a multi-function device for providing printing, scanning, copying and/or faxing services.

6. A wholly-contained apparatus in accordance with claim 1 wherein said controlled device is controlled by said terminal means and said computer means.

7. A wholly-contained apparatus in accordance with claim 1 wherein said terminal means is for handling cash payment as well as credit, debit, and account charges for said user.

8. A wholly-contained apparatus in accordance with claim 1 wherein said algorithm for processing transactions provides for payment transaction authorized by cell phone and wherein said payment transaction is processed through a service provider for said cell phone.

9. A wholly-contained apparatus in accordance with claim 1 further comprising a plurality of controlled devices in communication with said authentication device, said terminal means, and said computer means.

10. A wholly-contained apparatus in accordance with claim 1 wherein said computer means is further programmed with an algorithm for electronically transferring funds to or from said user's account at a bank.

* * * * *